Figure 1:
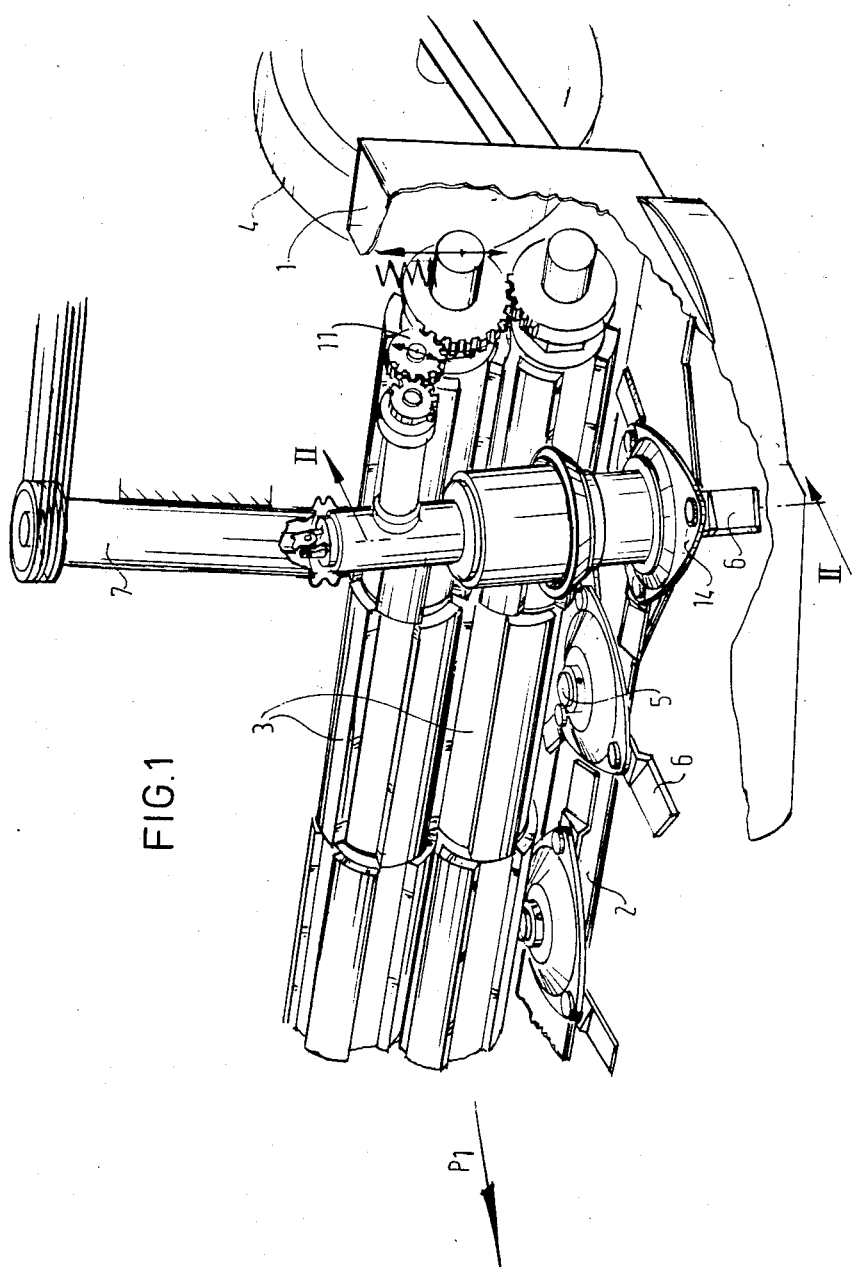

United States Patent [19]

Van Paradijs et al.

[11] Patent Number: 4,575,997
[45] Date of Patent: Mar. 18, 1986

[54] MOWING DEVICE HAVING IMPROVED DRIVE AND/OR A CROP SEPARATING DRUM

[75] Inventors: Hendrikus J. A. Van Paradijs, St. Oedenrode; Gysbert J. Mynders, Nieuw-Vennep, both of Netherlands

[73] Assignee: Multinorm B.V., Nieuw Vennep, Netherlands

[21] Appl. No.: 585,543

[22] Filed: Mar. 2, 1984

[30] Foreign Application Priority Data

Mar. 4, 1983 [NL] Netherlands ............... 8300800

[51] Int. Cl.⁴ .................................. A01D 43/10
[52] U.S. Cl. ........................... 56/16.4; 56/DIG. 1
[58] Field of Search .............. 56/16.4, DIG. 1, 13.6, 56/192

[56] References Cited

FOREIGN PATENT DOCUMENTS 2078348 5/1971 France ................ 56/DIG. 1
7317824 12/1973 Netherlands ........ 56/DIG. 1

Primary Examiner—Jay N. Eskovitz
Attorney, Agent, or Firm—John P. Snyder

[57] ABSTRACT

A mowing device comprises a frame movable across a field and a cutter bar carried by said frame and having a plurality of cutting members rotatably driven about standing shafts through a transmission housed in said bar, said frame being adapted to accommodate crop crushing means at a higher level than the cutter bar, wherein a common main drive rotates one of the outermost cutting members and, if necessary, the crushing means through an intermediate drive arranged in a rotating drum on top of said outermost cutting member.

In order to limit the disadvantage of crop winding around the drum at low numbers of revolution and to minimize the imbalance of fast rotating cutting members the drum of the mowing device is constructed in the form of two coaxial, aligned drum parts, between which a gap-shaped space is left free.

9 Claims, 5 Drawing Figures

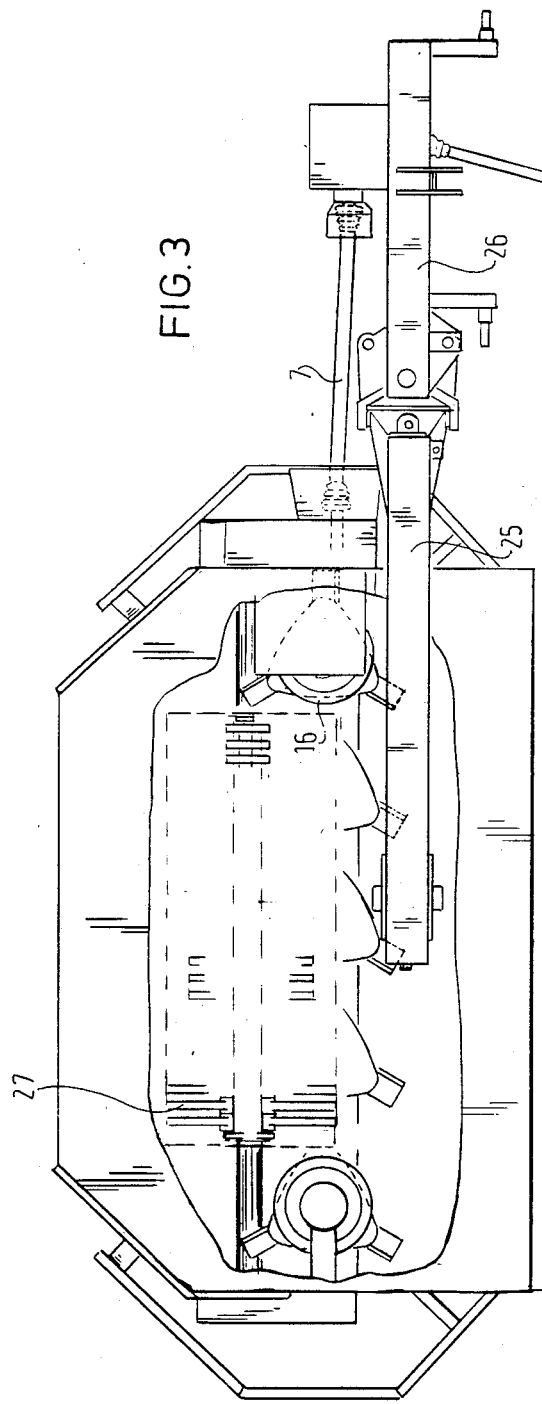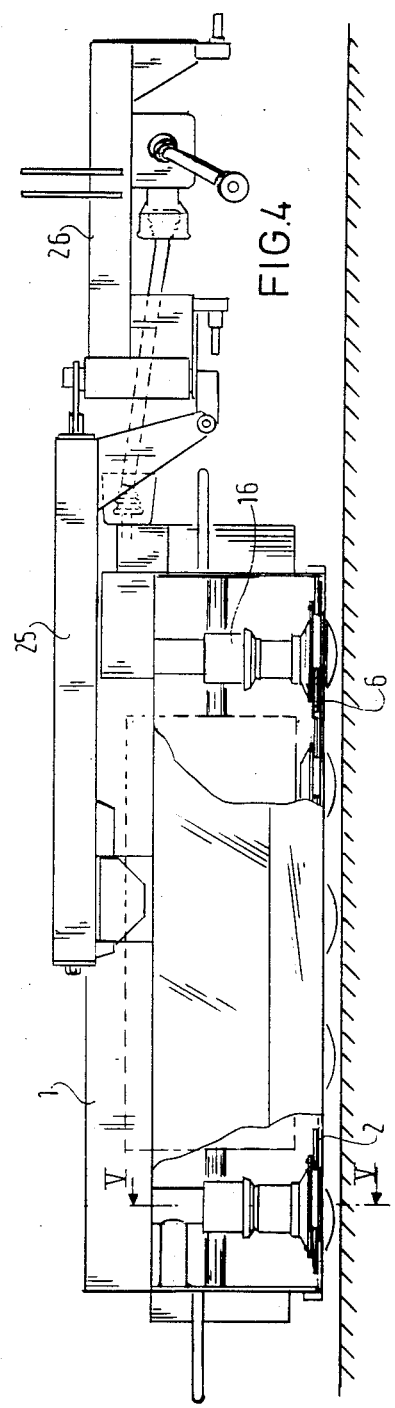

MOWING DEVICE HAVING IMPROVED DRIVE AND/OR A CROP SEPARATING DRUM

The invention relates to a mowing device mainly comprising a frame movable across a field and a cutter bar carried by said frame and having a plurality of cutting members rotatably driven about standing shafts through a transmission housed in said bar, said frame being adapted to accomodate crop crushing means at a higher level than the cutter bar, wherein a common main drive rotates one of the outermost cutting members and, if necessary, the crushing means through an intermediate drive arranged in a rotating drum on top of said outermost cutting member.

The known drums of such mowing devices have the disadvantage that at the upstart, that is to say, at low numbers of revolution the crop may readily wind around the drum. Therefore, the drum must not have a small diameter, but the diameter should neither be too large due to imbalance of fast rotating cutting members. Such an imbalance immediately affects adversely the bearing of the cutting members in the cutter bar.

The invention has for its object to improve the mowing drum in a sense such that apart from limiting the aforesaid disadvantage of crop winding the imbalance is minimized.

For this purpose the invention proposes to construct the drum of a mowing device in the form of two coaxial, aligned drum parts, between which a gap-shaped space is left free.

The drum parts are, therefore, not in contact with one another and are associated on the one hand with the cutting member and on the other hand with the frame. Thus the height of the drum is limited so that bending stress at the place of fastening due to imbalance is appreciably reduced. The drum part fastened to the frame need, moreover, not rotate.

Further a mowing device of the kind set forth in the preamble should have minimum weight, which involves that the various frame parts may indeed be strong but not rigid. As a consequence proportional variations may occur between cutter bar and frame, which adversely affects the longevity of the various driving members.

The invention has for its object to obviate the aforesaid disadvantage and provides to this end a mowing device in which the intermediate drive comprises length compensating means. These length compensating means can neutralize any size variation so that additional stresses in the various component parts are avoided.

In one embodiment the intermediate drive is formed by a shaft having one or more axially slidable parts.

Moreover, the intermediate drive may have a flexible structure in order to compensate for or to perform undesirable and, respectively, desired angular turns between cutter bar and frame.

In a preferred embodiment the gap-shaped space between the drum parts is overlapped on the inner and/or outer side by an annular element fastened to one of the drum parts. Such an annular element prevents dust and dirt or crop particles from getting between the drum parts, which could result in caking on one of the drum parts and an undesirable imbalance.

When the annular element is arranged on the inner side, it preferably has a cross-section opening outwards in the form of a gutter.

Practical tests have shown that best results are ensured when the end flange of the gutter-shaped ring extends in a transverse plane of the drum part. It is then preferred to shape the gutter-shaped element with a rectangular, U-shaped cross-section.

When the annular element is arranged on the outer side, the element should, in accordance with the invention, be at an angle differing from 90° to the drum wall. In this way an effective, outwardly direction swing is exerted on the crop parts so that the drum is self-cleaning.

Preferably the opposite drum part has a bent-over end rim which is parallel or substantially parallel to the outer annular element so that an upwardly or downwardly inclined, annular gap is formed between the drum parts.

According to a further feature of the invention the outer annular element will overlap the bent-over end rim.

In the preferred embodiment the same drum part has both the inner and the outer annular element.

In order to obtain a satisfactory stream of crop across the device, that is to say, from the cutting members towards the crop crushing means the invention proposes to shift the or each cutting member provided with a drum with respect to the other cutting members over a given distance in the direction of movement. Then the drum will separate the crop in due time and pass the crop mown laterally towards the crop crushing means, whereas the other cutting members are arranged sufficiently near the crushing means for the intended effective passage.

The above-mentioned and further features of the invention will become apparent from the following description of the Figures showing two embodiments.

The drawing shows in

Figure 2:
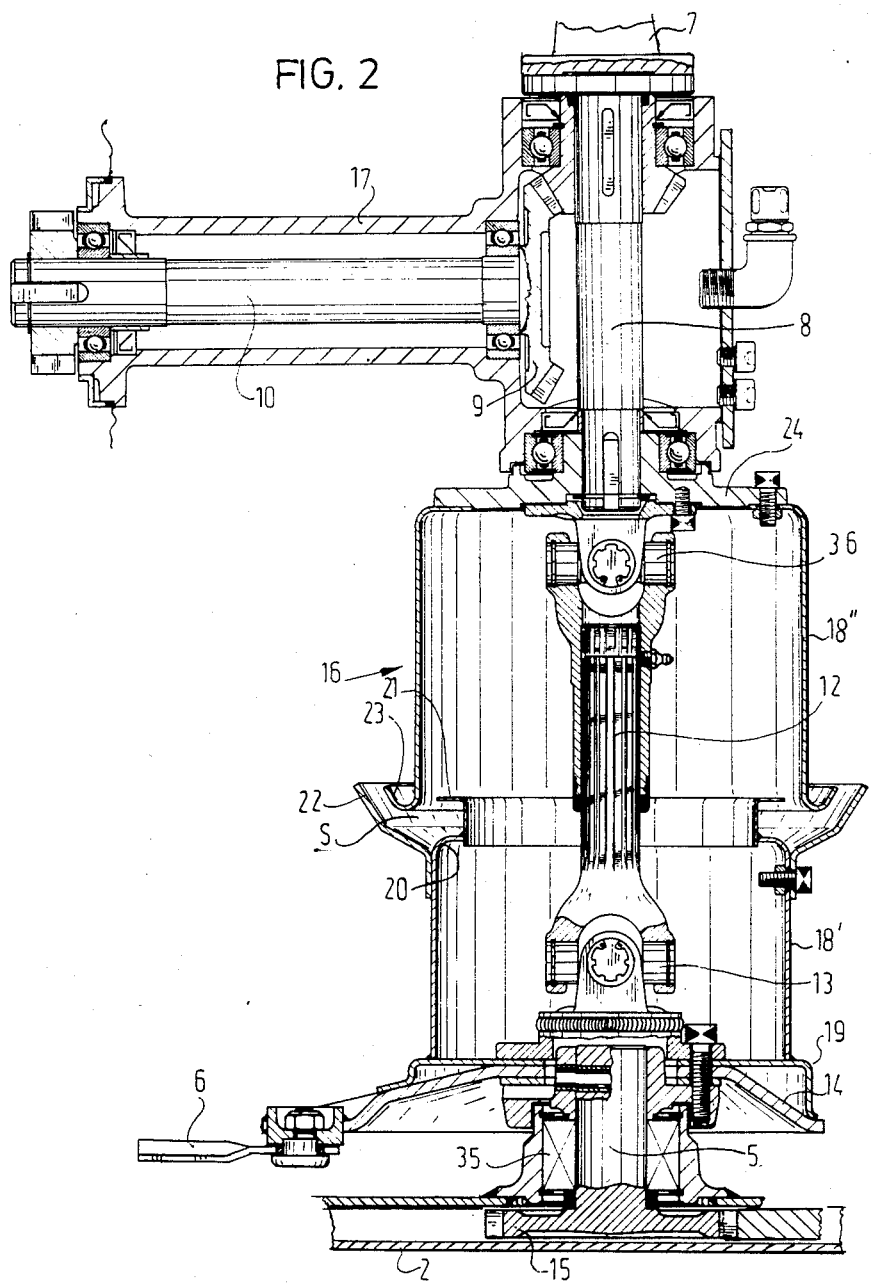
Figure 5:
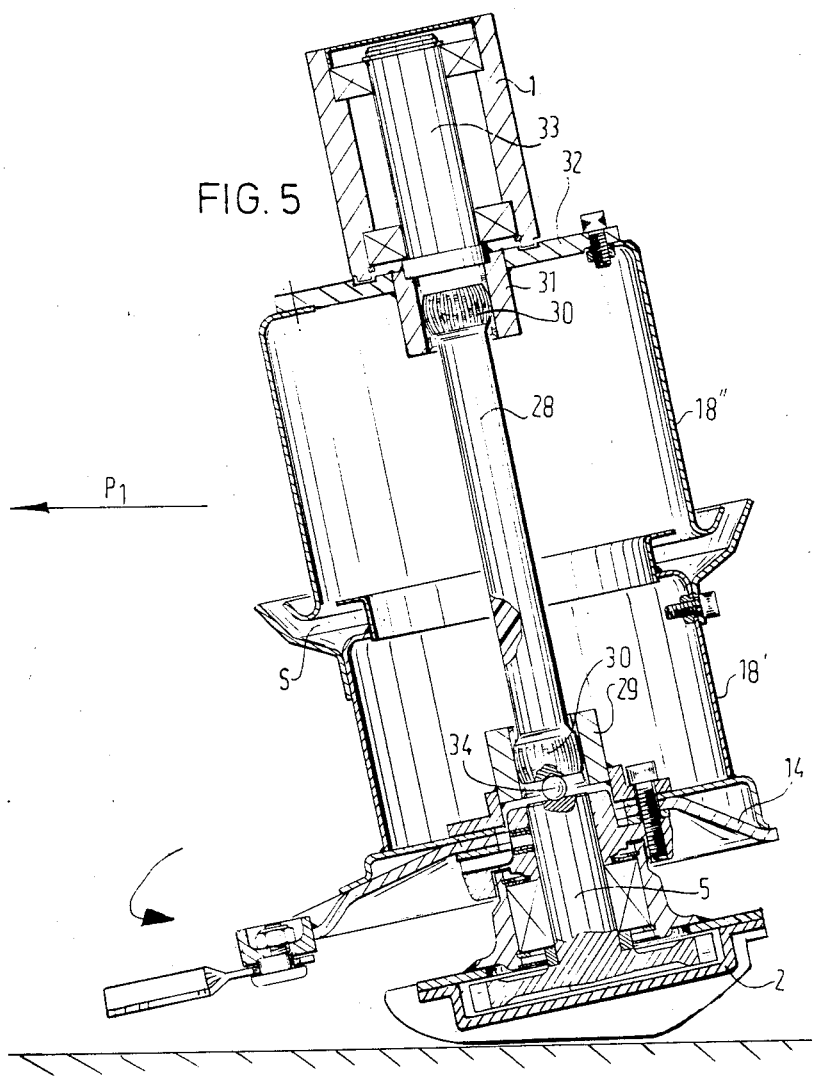

FIG. 1 a perspective front view of a first embodiment of part of a mowing device, FIG. 2 a sectional view taken on the line II—II in FIG. 1, FIGS. 3 and 4 a front view and a plan view respectively of a second embodiment of another type of mower, FIG. 5 a sectional view taken on the line V—V in FIG. 4.

The mower shown in FIG. 1 mainly comprises a frame 1 provided on the underside, directly above the ground, with a cutter bar 2. At a higher level than the cutter bar a pair of rollers 3 covering the entire width of the device is rotatably journalled in the frame 1. The mode of driving, bearing and shape of the crushing rollers 3 are lying outside the scope of this invention and need not be discussed in detail.

The frame is drawn by an agricultural tractor or the like in the direction of the arrow P1 across the field, the frame being supported by ground-engaging wheels 4 on the rear side.

The cutter bar accomodates in known manner a transmission for driving cutting members 6 arranged side by side and rotating about standing shafts 5 so that the cutting members 6 work overlapping strips of crop.

The crushing rollers 3 and the cutting members 5 are driven by the main drive 7 from the tractor or the like. The main drive 7 leads to a standing shaft 8 (see FIG. 2) provided on one side with a bevel gear wheel transmission 9 for driving a lying shaft 10 leading to a gear wheel system 11 for the crushing rollers 3.

On the lower side the standing shaft 8 is provided with a universal joint 36 of an intermediate drive formed by a sliding shaft 12 also provided on the underside with a second universal joint 13. The universal joint 13 is fastened to the outermost cutting disc 14 of the cutting members 6, said disc 14 being rigidly secured to a standing shaft 5, which is rotatable in bearings 35 in the cutter bar 2. The lower end of the standing shaft 5 is provided with a gear wheel 15 meshing with the further transmission gear wheels in the cutter bar 2 for driving the neighbouring cutting members.

In the embodiment shown the intermediate drive 12 is screened by a simultaneously rotating drum 16, which will be described more fully hereinafter.

Owing to the specific intermediate transmission in the form of a sliding shaft 12 with universal joints 36,13 the length of the intermediate transmission is compensated for so that a relative displacement between the cutter bar 2 and the drive housing 17 of the standing shaft 8 and the lying shaft 10 respectively rigidly connected with the frame 1 is enabled. With this precaution the cutter bar 2 and the frame 1 respectively may have a light-weight structure so that sufficient strength is obtained, whereas the rigidity required is low. Any additional load on the bearings 35 of the cutting discs 14 is thus avoided.

The flexibility of the intermediate drive is ensured by the universal joints 36 and 13, which also permit small angular turns of the cutter bar. In this way it is also simply possible to position the standing shafts 5 of the cutting members 6 in a forwardly inclined direction.

Finally it is noted that it is apparent from FIG. 1 that the driven moving disc 14 of the outermost cutting members 6 is displaced forwards with respect to the other cutting members of the cutter bar 2 in the direction of movement P1. This has the advantage that sufficient space is obtained for driving the outermost cutting member and the crushing rollers 3, particularly when the screening drum 16 is used. The screening drum 16 has furthermore a crop separating function so that the crop is effectively conducted towards the crushing rollers 3, whilst nevertheless the crop cut by the cutting members nearer the rollers 3 is passed unhindered through the nip of the rollers 3.

Now the drum 16 around the intermediate drive 12 will be discussed.

FIG. 2 clearly shows that the drum 16 comprises two parts, the lower drum part 18' being rigidly secured to the mowing disc 14 by means of a matching foot part 19. The drum wall extends upwards from the mowing disc 14 and is inwardly bent over at 20, the inner rim being fastened to an L-section ring 21. The design is such that the gap-shaped space S between the lower drum part 18' and the upper drum part 18" is overlapped. Furthermore viewed in a cross-section the annular element has an outwardly open gutter-like shape, the gutter having a rectangular U-shaped cross-section. The flange of the part 21 extends in a transverse plane, which, as has been found in practice, prevents caking of crop parts, dust and other dirt.

The lower drum part 18' is furthermore provided with an outer, annular element 22, the web of which is at an angle differing from 90° to the wall of the drum part 18'. The web overlaps again the gap-shaped space S and is sharply bent over in cross-section. The upper drum part 18" is bent over in beaded fashion on the underside at 23, it being noted that the flange 23 is substantially parallel to the part 22. The top rim of the part 22 overlaps, however, the end rim of the flange 23.

This drum construction ensures that practically no crop parts can penetrate into the gap-shaped space S.

It should be noted that an inverted construction is also possible, whilst the part 22 may be fastened to the upper drum part 18".

From FIG. 2 it is furthermore apparent that the upper drum part 18" is fastened on the top side to a flange 24 rigidly secured to a standing shaft 8 so that the upper drum part 18" rotates at the same rate as the lower drum part 18'. Since the gap-shaped space S is located approximately midway the height of the overall drum 16, the loads on the bearings will be low for the two drum parts. Moreover, owing to the small height of the drum parts they can be made by deep drawing.

FIGS. 3 and 4 show a different type of mower; corresponding parts are designated by the same reference numerals.

The frame 1 is also provided on the underside with a cutter bar 2 with cutting member 6. In the middle the frame 1 is provided with a drawbar 25 connected with a trestle 26, which can be attached to the three-point hitch of any agricultural tractor. The device is again driven through the main drive 7 linked on the one hand to a crushing member formed by clappers 27 rotatably arranged in the frame and on the other hand to an intermediate drive arranged in the drum 16 like in the embodiment of FIGS. 1 and 2.

In the embodiment shown the two outermost cutting members 6 each have a drum structure 16, since the crushing member 27 does not cover the full width of the cutter bar 2. The drums 16, therefore, have in this case a crop separating and transporting function.

The drum 16 on the left-hand cutting member in FIG. 4 is shown in a cross-sectional view in FIG. 5. The drum has the same design as that of FIG. 2, but a standing shaft 28 is passed across the drum for driving the upper drum part 18".

For this purpose the lower mowing disc 14 is rigidly secured to a sliding sleeve 29, in which a spherical toothed crown 30 is axially slidable. With this spherical shape the shaft 28 can also perform an angular turn with respect to the sleeve 29.

On the top side the shaft 28 is also provided with a ball-shaped toothed crown 30, which cooperates with a toothed sleeve 31, which is rigidly secured to the upper flange 32 of the upper drum part 18". The flange 32 is rotatable by means of the shaft 33 in the upper frame beam 1. Between the shaft 28 and the standing shaft 5 a socket bearing is arranged in the form of a single ball 34.

For completeness' sake it is noted that the shaft 28 is made from synthetic resin.

The construction shown again ensures that the upper drum part 18" rotates with the same speed as the lower drum part 18', whilst the gap S between the drum parts is "sealed" in the same manner as described above.

The invention is not limited to the embodiments described in the foregoing.

For example, the separation between the drum parts may be arranged at a different level, the larger drum part being, for example, rigidly secured to the frame 1 so that the problem of imbalance is avoided.

In practice the annular elements 21 and 22 may have any desired shape.

The driving shafts shown for the intermediate drive 12 may also be shaped in any suitable form. For example, the intermediate shaft of FIG. 2 may be replaced by the synthetic resin shaft 28 of FIG. 5. The flexibility required for the small angular turn between cutter bar and frame 1 may also be obtained by using such a synthetic resin that bending of the driving shaft 28 is allowed.

What is claimed is:

1. A mowing device comprising a frame movable across the field and a cutter bar carried by the frame and having a plurality of cutter members rotatable about standing shafts by means of a transmission arranged in said bar, said frame being adapted to accommodate rotatable crop crushing means at a higher level than the cutter bar, whilst at least one of the outermost cutting members is provided with a drum characterized in that the drum comprises two coaxially aligned parts, said aligned parts having overlapped end portions in which one of said end portions is disposed within the other of the end portions and said end portions terminating in generally parallel edges inclined with respect to the axes of said drum parts to protect the interior of the drum from dirt or other material, a main drive rotates said crushing means and said one cutting member through an intermediate drive disposed in said drum, said intermediate drive including length-compensating means and being formed by a shaft of non-metallic material.

2. In a rotary mowing device, a frame adapted to be attached to a powered vehicle, said frame including an elongate housing adapted to be swept over the ground and having rotary cutter drive means housed therein, said drive means including a plurality of upstanding cutter shafts projecting upwardly from said housing, a rotary cutter fixed to each of said shafts, said frame also including a main frame part disposed in spaced relation above said housing, a generally vertical drive shaft journalled in said main frame part in substantially aligned relation with one of said cutter shafts and disposed in spaced relation thereabove, intermediate drive means drivingly connecting said main drive shaft with said one cutter shaft for accommodating relative axial movements and misalignments between said drive shaft and said one cutter shaft incident to working loads imposed on said device, crop crushing means carried by said frame above and behind said cutter bar housing for receiving crop cut by said rotary cutters, and drum means enclosing said intermediate drive means for allowing said relative axial movements and misalignments incident to working loads imposed on the device, said drum means comprising a lower drum portion fixed to and upstanding from that rotary cutter fixed to said one cutter shaft and an upper drum portion carried by said main frame part and being substantially coaxial with said upper drum portion, said lower drum portion being of a height just substantially sufficient to direct cut crop to said crushing means whereby minimally to impose rotary imbalance loads upon said one cutter shaft.

3. In a device as defined in claim 2 wherein said lower drum portion is provided with an outwardly flaring upper end portion which overlaps a lower end portion of said upper drum portion.

4. In a device as defined in claim 3 wherein said lower end portion of the upper drum portion is in the form of an annular trough.

5. In a device as defined in claim 4 wherein said annular trough includes an outer wall substantially parallel to said outwardly flaring upper end portion.

6. In a rotary mowing device as defined in claim 2 wherein said one cutter shaft and said drive shaft are displaced forwardly, in the direction of movement of the mowing device, with respect to the cutter shaft adjacent thereto, said upper and lower drum portions having proximal end portions disposed in overlapping relation, said end portions being inclined with respect to the axes of said one cutter shaft and said drive shaft and being in substantially parallel, spaced relation to each other.

7. In a rotary mowing device, a frame adapted to be attached to a powered vehicle, said frame including an elongate cutter bar housing adapted to be swept over the ground and having rotary cutter drive means housed therein, said drive means including a plurality of upstanding cutter shafts projecting upwardly from said housing, a rotary cutter fixed to each of said shafts, said frame also including a main frame part disposed in spaced relation above said housing, a generally vertical drive shaft journalled in said main frame part in substantially aligned relation with one of said cutter shafts and disposed in spaced relation thereabove, intermediate drive means drivingly connecting said main drive shaft with said one cutter shaft for accommodating relative axial movements and misalignments between said drive shaft and said one cutter shaft incident to working loads imposed on said device, crop crushing means carried by said frame below said main frame part but above and behind said cutter bar housing for receiving crop cut by said rotary cutters, and drum means enclosing said intermediate drive means for allowing said relative axial movements and misalignments incident to working loads imposed on the device, said drum means comprising a lower drum portion fixed to and upstanding from that rotary cutter fixed to said one cutter shaft and an upper drum portion, fixed to said drive shaft and depending from said main frame part and being substantially coaxial with said upper drum portion, said drum portions being of generally equal heights with their proximal end portions overlapping to define an annular gap therebetween.

8. In a rotary mowing device as defined in claim 2 or 7 wherein said intermediate drive means comprises a shaft of non-metallic material.

9. In a rotary mowing device as defined in claim 2 or 7 wherein said one cutter shaft is displaced forwardly in the direction of movement over the ground with respect to at least a plurality of the remaining cutter shafts.

* * * * *